United States Patent [19]

Zahn et al.

[11] 4,197,169

[45] Apr. 8, 1980

[54] SHUNT CURRENT ELIMINATION AND DEVICE

[75] Inventors: Markus Zahn, Gainesville, Fla.; Patrick G. Grimes; Richard J. Bellows, both of Westfield, N.J.

[73] Assignee: Exxon Research & Engineering Co., Florham Park, N.J.

[21] Appl. No.: 939,325

[22] Filed: Sep. 5, 1978

[51] Int. Cl.$^2$ .................. C25B 1/00; C25B 15/06; C25B 9/04; H01M 14/00
[52] U.S. Cl. .................................. 204/1 R; 204/228; 204/253; 204/267; 204/268; 204/269; 429/18; 429/111
[58] Field of Search .............. 204/228, 269–270, 204/253–258, 275, 129, 237, 1 R, 267, 268, 98; 429/18, 111

[56] References Cited

U.S. PATENT DOCUMENTS

| 857,378 | 6/1907 | Betts | 204/228 X |
|---|---|---|---|
| 2,432,013 | 12/1947 | Hanson | 204/228 X |
| 3,622,490 | 11/1971 | Lockett | 204/228 X |
| 3,909,368 | 9/1975 | Raymond et al. | 204/228 X |
| 4,057,473 | 11/1977 | Cunningham et al. | 204/98 |

FOREIGN PATENT DOCUMENTS 1295851  11/1972  United Kingdom .................. 429/18

Primary Examiner—John H. Mack
Assistant Examiner—D. R. Valentine
Attorney, Agent, or Firm—Kenneth P. Glynn

[57] ABSTRACT

The present invention is directed to a method of minimizing shunt currents in electrochemical devices which have a plurality of cells connected, at least in part, in series and which have an electrolyte which is a common electrolyte to at least two of the cells and which includes shared electrolyte, whereby an electrical electrolytic conductive bypass path is created around such cells and through said shared electrolyte, resulting in undesirable shunt currents. The method involves applying a protective current through at least a portion of said conductive bypass path through said shared electrolyte in a direction which is the same as the shunt current through said shared electrolyte and of a magnitude which effectively at least reduces said shunt currents. Thus, a single protective current is applied in series with at least a portion of the conductive bypass path such that shunt currents are minimized, and preferably are totally eliminated. The present invention is also directed to an electrochemical device having means adapted for applying the protective current thereto.

34 Claims, 6 Drawing Figures

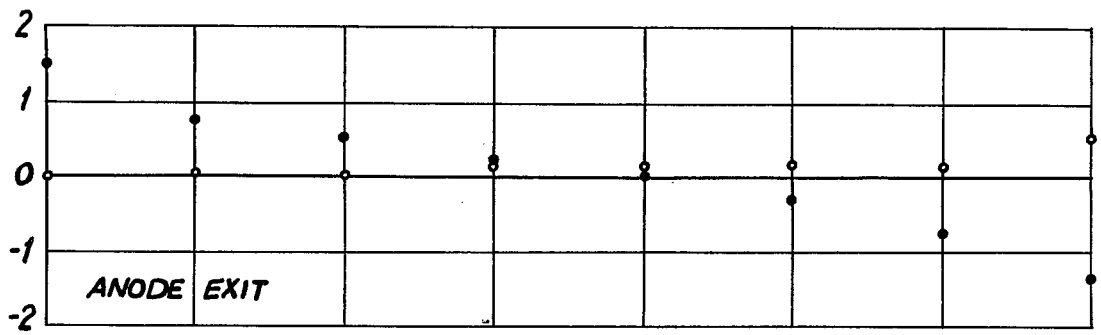
SHUNT CURRENTS - WITH and WITHOUT PROTECTION DURING DISCHARGE - EXAMPLE 6
• WITHOUT PROTECTION
○ WITH PROTECTION
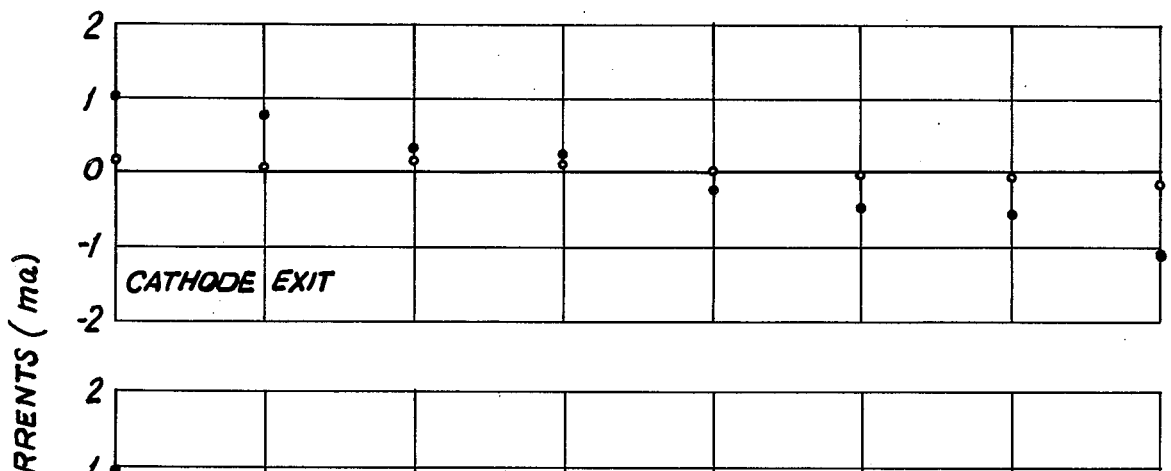

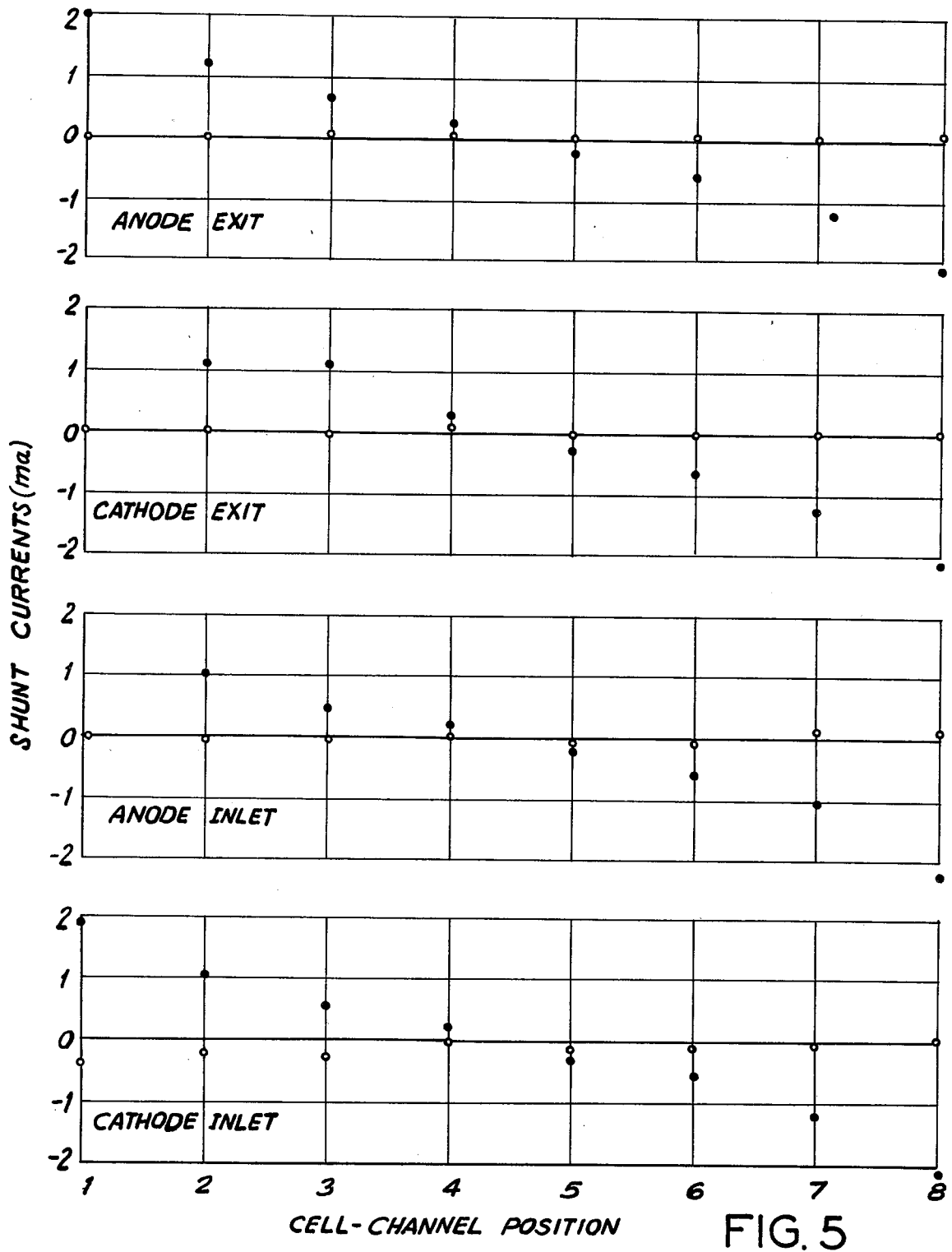

SHUNT CURRENT ELIMINATION AND DEVICE

BACKGROUND OF THE INVENTION (1) Field of the Invention

The present invention is directed to the reduction or elimination of undesirable shunt currents in electrochemical cell devices having a plurality of cells connected, at least in part, in series, and having an electrolyte which is a common electrolyte to at least two of these cells, and which includes shared electrolyte, whereby an electrical electrolytic conductive bypass path is created around these cells and through said shared electrolyte, which results in undesirable shunt currents. More specifically, the present invention is directed to such shunt current reduction or elimination by appropriate application of a protective current, and to an electrochemical device for achieving this result.

(2) Prior Art

In multicell electrochemical devices having a plurality of cells in series and having a common electrolyte, e.g. circulating through the cells, shunt current losses (also known as current bypasses) occur as a result of conductive paths through the electrolyte during both charge and discharge. These shunt current losses may also occur under open circuit conditions, and cause undesired discharge of electrochemical devices. Additionally, these shunt currents may have secondary undesirable effects on electrochemical devices. For example, uneven or improper plating of a functional component may occur, ultimately resulting in a shortened utility of the device. Also, corrosion of the electrodes and/or other components may occur, reactants may unnecessarily be consumed and excess thermal losses may result. Thus, shunt current problems have been recognized in the field of electrochemical devices for many reasons, and various modifications to such devices have been made to reduce or eliminate these as well as other recognized problems.

For example, it has been suggested that multiple cell systems include electrical isolation means for minimizing shunt current effects. Thus, U.S. Pat. No. 3,773,561 (Bjorkman) teaches that internal short circuiting of a plurality of electric cells of a cell stack may be prevented during shutdown, or standby, by sealing off the cells from electrical contact with each other by closing off inlet and outlet ports to isolate electrolyte portions in the individual cells. U.S. Pat. No. 3,806,370 (Nischik) describes an electrolyte interrupter system for providing intermittent flushing of the electrolyte in a fuel cell battery having several fuel cells in which the electrodes are held in plastic frames. The electrolyte interrupter system is made up of an electrolyte distributor and an electrolyte manifold arranged in the frames of the individual fuel cells. Electrolyte supply ducts for each cell open into the electrolyte distributor, and electrolyte discharge ducts for each cell open into the electrolyte manifold. The electrolyte distributor and the electrolyte manifold are each formed by mutually aligned holes in the upper portions of the frames, with the bottom of the holes forming the electrolyte distributor being located at least at the same height as the openings of the electrolyte discharge ducts leading into the electrolyte manifold. U.S. Pat. No. 3,378,405 (Schumacher et al) teaches the electrical isolation of cells from one another in a sodium amalgam anode-oxidant multicell fuel cell system by using one, and pref,erably two, dielectric interrupters per cell. U.S. Pat. No. 4,025,697 (Hart) describes multicell devices in which electrolyte is distributed in a two stage system in which a large pump (first stage) distributes the electrolyte through hydraulically driven circulators (second stage) to individual electrode compartments which are electrically isolated from each other. The overall system results in minimizing intercell leakage and intercell power losses through shorting circuits through the electrolyte.

Other techniques for electrolyte interruption, as a means for preventing internal or shunt current losses in multicell devices, have also been taught. For example, U.S. Pat. Nos. 3,537,904 (Matsuda et al) and 3,522,098 (Sturm et al) describe the insertion of gas bubbles into the electrolyte solution to reduce or break up the conductive path through the electrolyte.

Alternative methods have also been suggested. For example, U.S. Pat. No. 3,666,561 (Chiku) describes an invention which provides an electrolyte circulating battery in which the flow of current between cells is minimized by having branded electrolyte inlet and outlet passages to and from the cells, these passages being greatly lengthened and considerably reduced in cross-section so that the electrical resistance of the electrolyte in each branched passage is increased. The patent also teaches further preventing internal currents by the use of gas bubbles injected into the electrolyte paths to further increase electrical resistance.

Geometric redesign has also been employed without gas bubbles to prevent or reduce shunt current or internal circuit losses. For example, U.S. Pat. No. 3,964,929 (Grevstad) teaches shunt current protection in fuel cell cooling systems by providing coolant circulation means and plenums adapted to create high electrical resistance paths. U.S. Pat. No. 3,540,934 (Boeke) points out that in-series multicell redox systems may have shunt current problems even when electrically non-conductive tubing is used. The patent teaches that electrical shunting will cause negligible inefficiency if the individual electrolyte fluid passages, connecting each individual electrode chamber with a central flow system, have a length to average inside diameter ratio of ten to one or more. U.S. Pat. No. 3,634,139 sets forth a design approach to the shunt current problems. The patent teaches that leakage currents can be minimized by proper manifold design. As an example, it is stated that by making electrolyte branch (or channel) ports small even though the manifold diameter is relatively large, leakage current can be neglected. However, if the ports are made too small, electrolyte flow may be retarded. The patent states that ports of about one-tenth of an inch in diameter are acceptable and manifolds of about one-eighth of an inch in diameter are acceptable.

U.S. Pat. No. 4,049,878 (Lindstrom) is representative of the present state of the art effort to solve leakage current problems. This patent indicates that many electrochemical devices contain a plurality of cells in stacked formation, which cells may be coupled in parallel groups, which groups are in turn coupled in series. Other embodiments are multicell devices in which the cells are only coupled in series. It is stated that more complicated coupling patterns are possible which are determined by the desire to reduce leakage currents in the electrolyte system and to create conditions for special electrical control modes with in-and-out coupling of individual parts of the stack. It is also pointed out that the natural way to reduce leakage currents is to minimize the dimensions of electrolyte channels, but that this technique results in electrolyte flow problems. The patent teaches a manner in which these problems may be avoided. The technique involves the use of fluid connections or cross-channels which are set up between the electrolyte spaces in the cells, which cells are being coupled electrically in parallel. These cross-channels are, in one embodiment, arranged in the lower parts of the electrolyte spaces so that some electrolyte is transferred between these electrolyte spaces by means of the cross-channels. In another embodiment, the cross-channels are also provided between the electrolyte spaces in the parallel-connected cells in the upper parts of the electrolyte spaces in order to produce a so-called plenum.

In a recent article by Burnett and Danley, of Monsonto "Current Bypass in Electrochemical Cell Assemblies", presented at the American Institute of Chemical Engineers' National Meeting, Atlanta (Feb. 26-Mar. 1, 1978) Symposium on Electro-organic Synthesis Technology, Session 1, Operating Experience with Electro-organic Processes, the problems of shunt current in circulating electrolyte multicell in-series devices is examined and derivations of certain mathematical relationships between geometry related currents and resistances in such devices are developed. The authors conclude that current bypass losses for certain cell arrangements may be held at an acceptable level, but that the losses increase rapidly with an increasing number of cells. Further, no specific solution for elimination of shunt current or current bypass of the type used in the present invention is derived or suggested. In fact, the authors describe 8 ft. long cell connections to the manifold to reduce the losses effected by shunt currents.

Recently issued U.S. Pat. No. 4,081,585 (Jacquelin) appears to be the only prior art reference which reduces leakage currents by nulling with electrodes. However, unlike the method and device of the present invention, this patent teaches the use of at least four times as many sets of electrodes as modules of cells and employs these electrodes in branch channels, an inferior and expensive technique at best.

Notwithstanding all of the foregoing efforts in the field to ovecome shunt current (leakage current) problems in multicell electrochemical devices, the novel and effective technique of the present invention has not heretofore been taught or suggested. In fact, the considerable prior art teachings as represented by the above references are directed toward problematic techniques which themselves create design and flow difficulties. These prior art teachings are in a direction away from the present invention and support the patentability thereof.

DESCRIPTION OF THE PRESENT INVENTION

The present invention is directed to a method of minimizing shunt currents in an electrochemical device having a plurality of cells connected, at least in part, in series, and having an electrolyte which is a common electrolyte to at least two of said cells and which includes shared electrolyte, whereby an electrical electrolytic conductive bypass path is created around these cells and through said shared electrolyte, which results in undesirable shunt currents. The method involves applying a protective current through at least a part of said conductive bypass path through said shared electrolyte in a direction which is the same as the shunt current through said shared electrolyte and of a magnitude which effectively at least reduces said shunt currents. The present invention is also directed to an electrochemical device having means adapted for applying the protective current thereto.

BRIEF DESCRIPTION OF THE DRAWINGS

FIGS. 4, 5 and 6 illustrate shunt current test results with and without protection.

DETAILED DESCRIPTION OF THE INVENTION AND DRAWINGS

Figure 1:
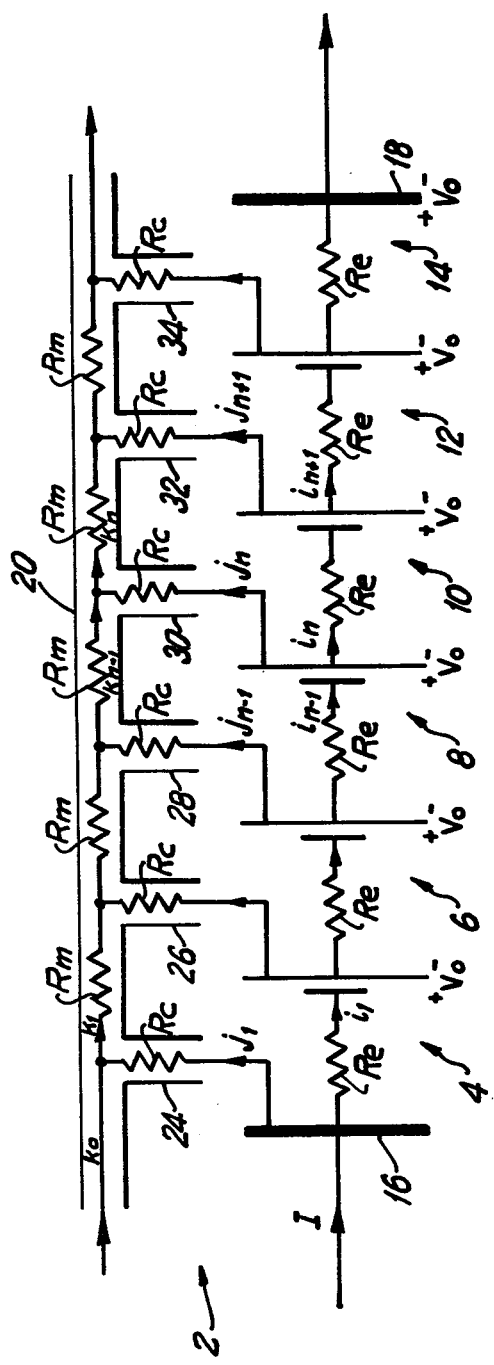
FIG. 1 illustrates an electrochemical device of the present inventions schematically.

In multicell electrochemical devices having a plurality of cells in series and having an electrolyte which is a common electrolyte to two or more such cells and which includes shared electrolyte, shunt current losses occur as a result of electrical electrolytic conductive bypass paths through the electrolyte around the cells. The present invention is directed to the minimization of shunt currents in such systems and to devices for achieving this result.

As used herein, the term "electrochemical devices" shall be meant to include photoelectrochemical devices such as water photolysis cell devices, photogalvanic cell devices, liquid solar cell devices and to include other electrochemical devices such as batteries, fuel cell devices, chloralkali cell devices, metal-air devices, sea water batteries, electrolyzers, electrochemical synthesizers, and electro-winning devices, as well as other devices employing cathodes, anodes and common electrolytes, including bipolar and monopolar multicell devices, and including devices having a plurality of electrolytes (e.g. catholytes and anolytes).

As used herein, the term "common electrolyte" shall mean an electrolyte which is employed in and distributed to two or more cells, the electrolyte comprising a physical continuum. In a circulating electrolyte system using one or more manifolds, the physical continuum includes the electrolyte contained within the manifolds, the branch channels and the cells. In a static electrolyte system, the physical continuum includes the electrolyte in the cells and the connecting areas of electrolyte, e.g. above or around the cells.

As used herein, the term "shared electrolyte" shall mean that portion of the electrolyte which is located in an area of commonality to the electrolyte contained in individual components. Thus, in a circulating electrolyte system using one or more manifolds, the electrolyte contained within reservoir(s) and manifold(s) is the shared electrolyte and electrolyte contained in branch channels, cells and other individual components is not shared electrolyte. In a static electrolyte system, the shared electrolyte is that electrolyte contained in the header space and/or common base areas of the device and not that electrolyte contained within each cell and within other individual components.

As used herein, the expression "minimization of shunt currents" shall be used to mean reduction of shunt currents or elimination of shunt currents.

In the development of the present invention, a resistance equivalent circuit model was derived for a multicell series electrochemical device having a common electrolyte which is physically connected in a continuum to the cells of the device via a common manifold or manifolds, establishing shared electrolyte, and through channels for each cell. The model was developed with the assumption that all of the cells in the device were identical. Based on this assumption, the governing circuit equations were written as linear, constant coefficient difference equations for which general closed form solutions were obtained for currents in the electrolyte within the cells (intracells), within the channels and within the manifold (shared electrolyte). Because the channel resistance was found generally to be much larger than the manifold and intracell electrolyte resistances, approximate algebraic solutions were also developed. It was demonstrated that a single externally imposed current passed from the last cell to the first cell can result in minimization of shunt currents and, in fact, optimally, may effectively set all channel currents to zero.

Each cell was modeled as an ideal voltage source $V_o$ equal to its open circuit potential, in series, with an intracell electrolyte resistance $R_e$. Then, as shown in FIG. 1, the current through the electrodes divides so that some current passes through each channel into the manifold (shared electrolyte). The variables used in FIG. 1 are as follows:

$R_m$ = manifold resistance;
$R_c$ = channel resistance;
$R_e$ = intracell electrolyte resistance (including internal components such as separators and membranes);
$V_o$ = open circuit cell voltage;
$i_n$ = the principle electrolyte current through the nth cell;
$j_n$ = the channel shunt current through the nth channel;
$k_n$ = the manifold shunt current through the manifold between the nth and the nth+1 channels;
$k_o$ = the current through the manifold needed to reduce shunt currents to zero; and,
$I$ = the total terminal current through the electrochemical device As shown in FIG. 1, an electrochemical device is illustrated schematically as 2 and contains cells 4, 6, 8, 10, 12, and 14 arranged in series. Current I passes through device 2 from end plate 16 to end plate 18, as shown. Common electrolyte (not shown) forms a single physical continuum through each cell via common manifold 20, containing shared electrolyte, through individual cell channels 24, 26, 28, 30, 32, and 34. The resistance of the electrolyte in each cell is shown as $R_e$, the resistance of the manifold is shown as $R_m$ and the resistance of each channel is shown as $R_c$. The currents $i_n$, $j_n$ and $k_n$, as defined above, are also illustrated.

Each electrolyte section was modeled with its appropriate resistance. Kirchoff's current and voltage laws applied at the nth cell requires.

$$i_{n-1} - i_n = j_n \tag{1}$$

$$k_{n-1} - k_n = -j_n \tag{2}$$

$$k_{n-1}R_m - R_c(j_n - j_{n-1}) - i_{n-1}R_e = V_o \tag{3}$$

The algebra is greatly simplified if equation (3) is rewritten with the index n increased by 1:

$$k_n R_m - R_c(j_{n+1} - j_n) - i_n R_e = V_o \tag{4}$$

Then by subtracting (4) from (3) the terms involving the i's and k's just equal $j_n$ from (1) and (2) so that a single equation for the channel shunt currents is obtained:

$$j_{n+1} - Bj_n + j_{n-1} = 0 \tag{5}$$

wherein B is equal to $2 + (R_e + R_m)/R_c$.

Just as linear constant coefficient differential equations have exponential solutions, linear constant coefficient difference equations as in (5) have power law solutions of the form:

$$j_n = A\lambda^n \tag{6}$$

wherein A is the amplitude and wherein the characteristic parameter $\lambda$ (analogous to natural frequences in continuous systems described by differential equations) is found by substituting the assumed solution of (6) back into (5):

$$A\lambda^{n-1}[\lambda^2 - B\lambda + 1] = 0 \tag{7}$$

For non-trivial solution ($A \neq 0$, $\lambda \neq 0$) the bracketed term in (7) must be zero:

$$\lambda = B/2 \pm \sqrt{(B/2)^2 - 1} \tag{8}$$

Note that the two solutions in (8) are reciprocals of each other:

$$B/2 + \sqrt{(B/2)^2 - 1} = \frac{1}{B/2 - \sqrt{(B/2)^2 - 1}} \tag{9}$$

Because (5) is linear, the most general solution is a linear combination of both allowed solutions:

$$j_n = A_1\lambda^n + A_2\lambda^{-n} \tag{10}$$

where $\lambda$ is either root in (8).

The amplitudes $A_1$ and $A_2$ are evaluated by the boundary conditions. By symmetry, the current in the first cell $j_1 = J$ has an equal magnitude but opposite direction to the current in the last cell, $j_n = -J$ $$j_1 = J = A_1\lambda + A_2\lambda^{-1}$$

$$j_N = -J = A_1\lambda^N + A_2\lambda^{-N} \tag{11}$$

with solutions:

$$A_1 = \frac{-J(1 + \lambda^{-N+1})}{\lambda^N - \lambda^{-N+2}}$$

$$A_2 = \frac{J\lambda(\lambda + \lambda^N)}{\lambda^N - \lambda^{-N+2}}$$

Applying algebraic reduction, the channel currents are:

$$j_n = \frac{J}{\lambda^N - \lambda}[-\lambda^n + \lambda^{N-n+1}] \tag{12}$$

At this point, J is not yet known. However, $j_n$ can be used in solving equations (1) and (2). Focusing attention on (1), the homogeneous solution is first found by assuming $j_n$ as zero. Assuming power law solutions, the natural solution is a constant:

$$i_{n-1} - i_n = 0; \quad i_n = Ap^n; \tag{13}$$

$$Ap^{n-1}(1-p)=0; p=1; i_n=A \qquad (14)$$

The driven solution must have the same power law dependence as the $j_n$ and so are of the same form as (10). The total solution is then:

$$i_n = I + \frac{J\lambda}{(\lambda^N - \lambda)(\lambda - 1)} [\lambda^n + \lambda^{N-n} - 1 - \lambda^N] \qquad (15)$$

where the constant A in (14) is adjusted so that $i_o = I$, where I is the terminal current. Under open circuit conditions, $I = 0$. When the battery is being charged, I is positive; while under load, I is negative.

Similarly, the manifold shunt currents are:

$$k_n = k_o - \frac{J\lambda}{(\lambda^N - \lambda)(\lambda - 1)} [\lambda^n + \lambda^{N-n} - 1 - \lambda^N] \qquad (16)$$

where the initial manifold current $k_o$ is yet unspecified.

The important parameter J, which is the first channel current, is not yet known. Using (13), (14), (15) and (16) in (3) for any value of n ($n=2$ is the easiest), yields (17) or (18):

$$J = \frac{V_o + IR_e - k_o R_m}{R_m + R_e + \left[\dfrac{R_c(\lambda - 1)(\lambda^{N-1} + \lambda)}{(\lambda^N - \lambda)}\right]} \qquad (17)$$

$$J = \frac{(V_o + IR_e - k_o R_m)(\lambda^N - \lambda)(\lambda - 1)}{\lambda(R_e + R_m)(1 + \lambda^N)} \qquad (18)$$

The foregoing equation (17) or its alternative equivalent form (18), reveals that J can be modified if $k_o$ has a value other than zero. If J, the shunt current in the first branch channel, is reduced, then the $j_n$'s (equation (12)) are reduced. If $k_o$ has a value such that $$k_o = (V_o + IR_e)/R_m \qquad (19)$$

then J is zero and likewise the $j_n$'s are zero.

In this condition, equations (12), (15) and (16) reduce to:

$$i_n = I, \; k_n = k_o, j_n = 0 \qquad (20)$$

Thus, the foregoing suggests that the passage of a single protective current through the shared electrolyte in the manifold, in a device similar to that in FIG. 1, may minimize (reduce or eliminate) shunt or leakage currents.

The direction of this current is the same as the unprotected $k_n$ currents, i.e. the shunt current through the shared electrolyte.

It can also be seen from the above equations and the model in FIG. 1 that when a $k_o$ equal to that defined in equation 20 is passed through the shared electrolyte, that the voltage at each junction of the branch channel and the shared space is equal to that cell voltage. Thus, when the voltage drop through the branch channel is zero, there is no current. The voltage through the branch channel is nulled.

However, the voltages in the branch channels are not nulled when $k_o$ is different from equation (20). Nonetheless, the shunt currents in these channels may be reduced by applying some protective voltage, and this may be useful in practical electrochemical devices wherein an exact $k_o$ from equation (20) is not feasible.

From the practical standpoint, the utility of the foregoing approach requires a non-zero $R_m$. Furthermore, the utility is enhanced by geometric effects which increase the magnitude of $R_m$. Such effects can be increasing the length of the shared electrolyte space between cells and a reduction of the cross-sectional area of the shared electrolyte space. The ratio of the protective current to the current of the electrochemical device is thus reduced when the ratio of $R_m/R_e$ is increased. Hydraulic factors, however, should be considered, in particular with circulating systems, and design compromises made between flow of electrolyte and the passage of current in the shared space may be appropriate.

The foregoing analysis assumes a model in which the values of $R_m$, $R_c$, $R_e$, and $V_o$ are the same for all cells. However, in a practical device, these values will be determined by system geometry and manufacturing tolerances.

It is obvious, however, even in such cases, that the passage of protective current through the shared electrolyte will modify and reduce currents in the branch channels, although in such cases absolute nulling may not be accomplished.

The electrochemical device of the present invention comprises a conventional electrochemical device having a plurality of cells in series, and having a common electrolyte which is common to at least two cells and which includes shared electrolyte, whereby an electrical electrolytic conductive bypass path is created around these cells and through said shared electrolyte, which results in undesirable shunt currents, and further includes novel means adapted to apply a protective current through at least a portion of the conductive bypass path through the shared electrolyte to effectively minimize the shunt currents. Such means include oxidization/reduction reaction means at electrodes in the area of the shared electrolyte (e.g. manifold) of the electrochemical devices. These oxidation/reduction reactions should be compatible with the chemistry of the electrochemical device, as more fully described below.

Thus, the present invention involves a method and device involving the application of a protective current through an electrical electrolytic conductive bypass path in an operating electrochemical device having a plurality of cells connected, at least in part, in series, and having an electrolyte which is a common electrolyte to at least two such cells and which includes shared electrolyte, whereby an electrical electrolytic conductive bypass path is created around these cells and through said shared electrolyte, resulting in undesirable shunt currents in the absence of said protective current. Although the magnitude of the protective current may be determined by substitution of actual numbers of variables in the above equations, it should be noted that the retardation rather than total elimination of shunt current may be effected by employing a protective current of a different magnitude, if desired. Also, the magnitude of the protective current itself may be determined by trial and error independent of the foregoing equations, once the above described principles and criteria are recognized.

In one preferred embodiment of the present invention, the method of shunt current minimization is employed with an electrochemical device having non-circulating electrolyte(s). The electrolyte is static or, at least for some time is not being transported or circulated, and this electrolyte is common, i.e. is of a physical continuum, to at least two of the cells in series whereby an electrical electrolytic conductive bypass path is created through the electrolyte around the cells having the common electrolyte, resulting in undesirable shunt currents. The conductive bypass path includes shared electrolyte and it may be located at an electrolyte level above the cells, or it may be located through an independent common structural entity such as a base, a fill well or a fill manifold. In any event, the means for applying the protective current constitutes electrodes placed at each end of the path in the electrolyte externally from the cells and within the shared electrolyte. The application of the protective current through the path will effectively minimize the shunt currents.

In another preferred embodiment of the present invention, the method and device involves a circulating electrolyte (or electrolytes) whereby circulation through the device is achieved by one or more manifolds having a circulating common electrolyte, including shared electrolyte, through which the electrical electrolytic conductive bypass path is created, resulting in shunt currents. Means are provided for the application of a protective current through one or more manifolds, i.e. through the shared electrolyte portion of the conductive bypass path, to minimize the shunt currents. The protective circuit involves the passage of an electrolytic current through shared electrolyte in the manifold(s) and thus acts to minimize the production of shunt currents through the manifold(s) and through the branch channels connecting the cells to the manifold(s). There is, thus, a conversion from electronic current to electrolytic current. For example, electrodes may be inserted into shared electrolyte in the manifold(s) at or near the first and last channel-manifold junctures. Oxidization/reduction reactions at these electrodes convert the electronic current to an ionic current. Thus, at least in principle, any redox reactions may be used. For example, they could be the same as the reactions at the electrodes of the electrochemical device. Alternatively, other reactions may be used which are compatible chemically and electrically with the electrochemical device.

For example, $H_2$ could be anodically oxidized at one end of the electrochemical device and $H_2$ could be evolved at the other end. The two reactions in acidic solution would be

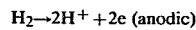
$H_2 \rightarrow 2H^+ + 2e$ (anodic)

and

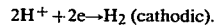
$2H^+ + 2e \rightarrow H_2$ (cathodic).

The $H_2$ gas produced could be piped back to the anodic electrode.

In another case, bromide could be oxidized at one electrode and bromine reduced at the other:

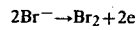
$2Br^- \rightarrow Br_2 + 2e$

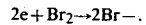
$2e + Br_2 \rightarrow 2Br^-$.

In another case, Zn could be oxidized at the anode and reduced at the cathode:

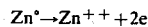
$Zn^\circ \rightarrow Zn^{++} + 2e$

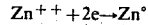
$Zn^{++} + 2e \rightarrow Zn^\circ$

The choice of the redox reactions is dependent on the particular system being protected and could follow standard electrochemistry, as a matter of choice. Further, the voltage and current requirements for the protective circuit will depend upon the choice of redox reactions and the resistance of the manifold solution in accordance with the foregoing discussion.

It should be noted that the electrochemical device described herein is one in its simplest terms which has a plurality of cells connected, at least in part, in series. However, an electrochemical device of the present invention may be just that or may, on a larger scale, consist of two or more blocks of cells connected electrically in series and have common electrolyte(s) supplied to and removed from the blocks in parallel from major manifolds. Each block of cells may consist of two or more cells in series, with these cells being supplied with electrolyte in parallel from submanifolds in the block of cells. Such systems would have shunt currents within the blocks through the block manifolds and would have shunt currents between the blocks of cells through the main manifolds. These can be minimized with protective currents in the block manifolds and in the main manifolds, as desired, without exceeding the scope of the present invention.

It is believed that the present invention embodying the method of minimizing shunt currents in electrochemical devices by employing protective currents and devices to achieve that result, will become more apparent from the following examples discussed in conjunction with the remaining drawings.

EXAMPLES 1 THROUGH 5—Electrolysis Experiments

Figure 2:
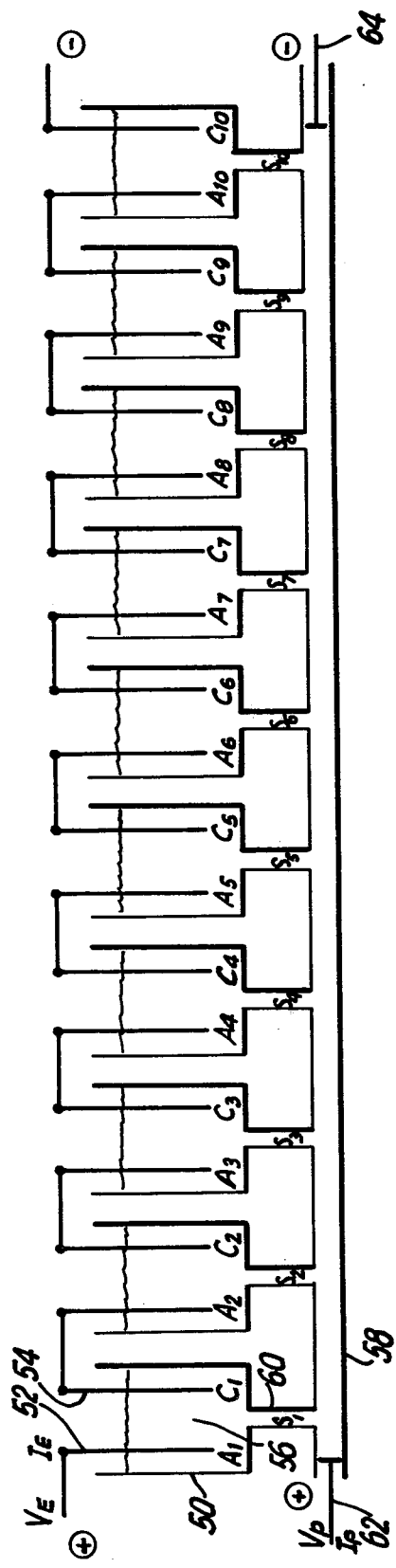
FIG. 2 illustrates an electrolyzer device of the present invention.

A ten cell $H_2O$ electrolyzer device was set up as shown in FIG. 2. In that figure, an exemplary cell is represented generally by 50. Cell 50 contains anode 52; cathode 54 and electrolyte 56. The anode and cathode are designated as A, and C, respectively, for this cell; $A_2$ and $C_2$ for the second cell; and $A_{10}$ and $C_{10}$ for the last (tenth) cell. $V_E$ and $I_E$ represent the voltage and current input to the device. Electrolyte is distributed through the cells by common manifold 58 (area of shared electrolyte) and cell channels exemplified by channel 60. The shunt current of the first cell is designated as $S_1$ in channel 60, and $S_2$, $S_3$, $S_4$, etc. through $S_{10}$ for the remainder of the cells, respectively. The electrodes were all about one inch wide nickel strips submerged about 1.5 inches into 1 M KOH electrolyte. The manifold 58 was about 0.25 inches in diameter and 25 inches long, and each channel was about 0.125 inches in diameter and about one inch long. The manifold 58 contained protective current electrodes 62 and 64, as shown, in the shared electrolyte, with a protective current $I_p$ and a protective voltage $V_p$. The channels, manifolds, and cell walls were made of non-conductive materials. Also, the protective current electrodes (nickel) 62 and 64 were near, but not at, the junction of the manifolds and the first and last channels, being placed within the area of shared electrolyte, as shown.

The device shown in FIG. 2 was operated with $V_E$ at 20.8 volts and $I_E$ at 124 ma. The evolution of $H_2$ and $O_2$ from the water occurred and was observed to decrease in quantity toward the center of the group of cells, i.e. as measured from either end going toward the center cells. A portion of the input current was shunting through the common electrolyte manifold and thus, the available current for gas $H_2$ and $O_2$ production was less in the center of the group of cells than at the end cells.

The shunt currents (electrolytic) in the connecting channels were measured with a clip-on ammeter. A second power supply was then connected to protective current electrodes located in the shared electrolyte in the manifold. The two levels of current were passed through the shared electrolyte in the manifold and the currents in the channels were measured with the clip-on ammeter. Subsequently, the current supplied to the electrolysis cell group was raised by a factor of 3.4 to 420 ma.

The current required from the second power supply to essentially eliminate the shunt current in the channels was now slightly higher but by no means 3.4 times higher. The second power supply was then removed and the shunt currents in the unprotected channels reappeared and were measured.

The results of these experiments are shown in Table I, below:

into compartment 92 via channel 94 does so via shared electrolyte manifold 114, which feeds catholyte to all of the cells. The catholyte exits compartment 92 via channel 116, and through shared electrolyte manifold 118, through which all catholyte exits.

Means for providing protective currents to this device 80 are located on each of the four manifolds within the shared electrolyte. Anolyte manifolds 108 and 112 have protective current negative electrodes 120 and 122, respectively, and protective current positive electrodes 124 and 126, respectively. Catholyte manifolds 114 and 118 have protective current negative electrodes 128 and 130, respectively, and positive electrodes 132 and 134, respectively. By way of example, a protective current is applied between negative electrode 120 and positive electrode 124 to effect the protective current through the shared electrolyte across manifold 108, thereby nulling or minimizing shunt currents passing

TABLE I
ELECTROLYZER EXPERIMENTS

| Example | Manifold Status | Electrolyzer Input Current (ma) | Electrolyzer Input Voltage (v) | Protective Input Current (ma) | Protective Input Voltage (v) | $S_1$ | $S_2$ | $S_3$ | $S_4$ | Shunt Currents (ma) $S_5$ | $S_6$ | $S_7$ | $S_8$ | $S_9$ | $S_{10}$ |
|---|---|---|---|---|---|---|---|---|---|---|---|---|---|---|---|
| 1 | Unprotected | 124 | 20.8 | 0 | 0 | +11 | +5 | +2 | — | +0.3 | −0.24 | — | −3.4 | −6.3 | −11.5 |
| 2 | Protected | 124 | 21.2 | 12.8 | 23.3 | +1.3 | +0.5 | −0.1 | −0.1 | −0.2 | −0.1 | +0.6 | +0.6 | −0.4 | −0.8 |
| 3 | Protected | 124 | 21.3 | 14.8 | 24.1 | +0.1 | −0.3 | −0.25 | −0.19 | −0.24 | −0.15 | −0.62 | +0.72 | +0.55 | −0.55 |
| 4 | Protected | 420 | 25.4 | 17.5 | 28.5 | +0.09 | +0.18 | +0.24 | +0.23 | +0.1 | +0.24 | −0.72 | +0.98 | +0.8 | −0.82 |
| 5 | Unprotected | 420 | 25.4 | 0 | 0 | +10 | +4.3 | +1.8 | +0.85 | −0.15 | −0.4 | −1.35 | −1.4 | −4.0 | −10 |

Table I illustrates that, by application of a protective current through the shared electrolyte in the common manifold of the electrolyzer, shunt currents are considerably minimized through the conductive bypass path formed by the channels and manifold. Table I also suggests that each cell in the series may effectively be operating at about equal currents when an appropriate protective current is applied.

Further, Table I shows that when electrolyzer input current is increased by a factor of 3.4, the protective current need only be increased a small amount to be effective.

EXAMPLES 6 THROUGH 8

Figure 3:
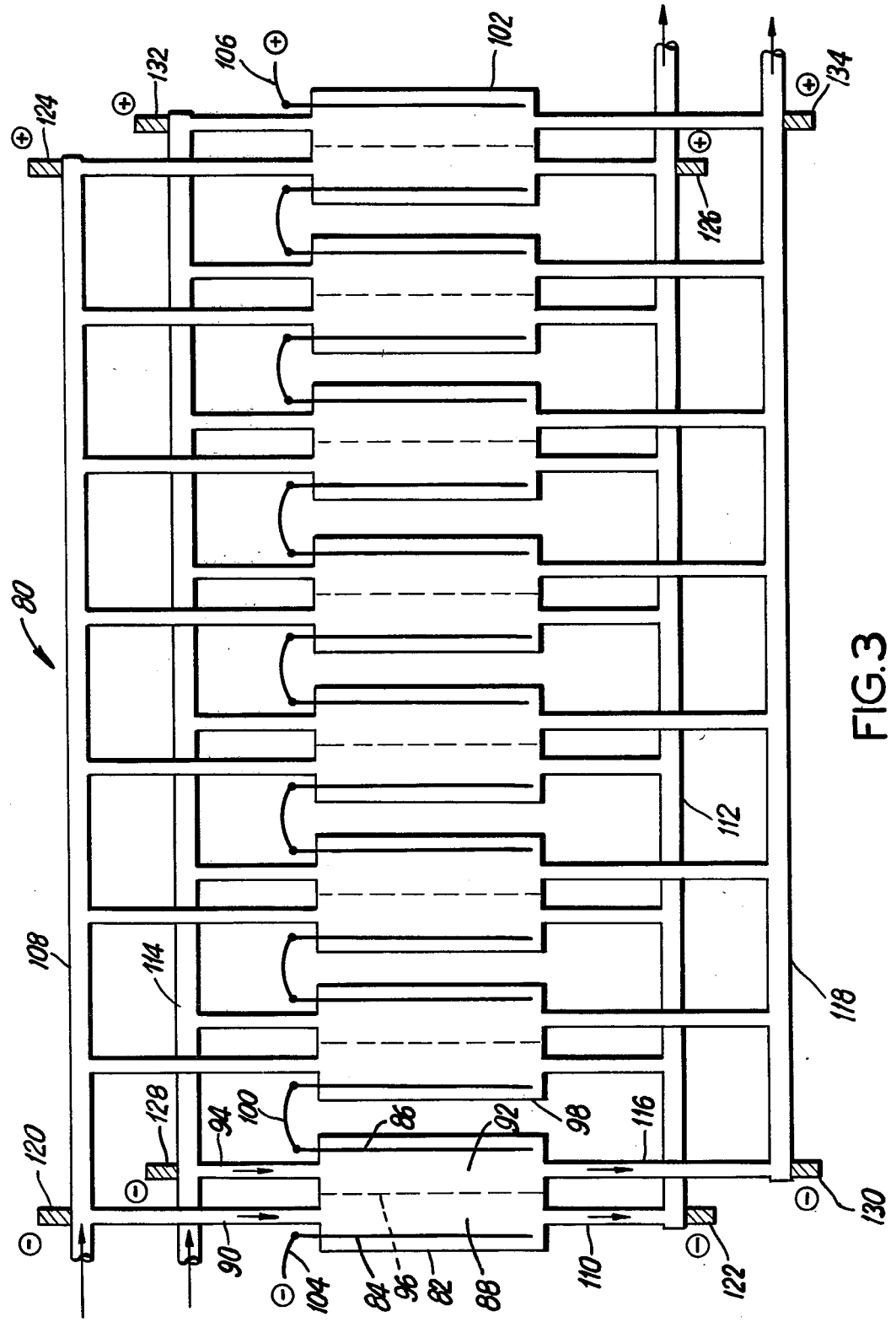
FIG. 3 illustrates a battery device of the present invention having a series connected stack of monopolar cells.

A protective current was employed in accordance with the present invention in conjunction with a stack of series connected zinc-bromine monopolar cells. As shown in FIG. 3, battery devices having a series connected stack of eight monopolar cells is illustrated generally as 80. Monopolar cell 82 is representative of the cells and contains anode 84 and cathode 86. Anolyte flows into cell 82 at compartment 88 via channel 90 and catholyte flows into cell 82 at compartment 92 via channel 94. Compartment 88 and compartment 92 are divided by ionically permeable membrane separator 96. Cell 88 is connected in series to the next adjacent cell 98 via connection 100. End cells 82 and 102 contain terminals 104 and 106, respectively. The anolyte flowing into compartment 88 via channel 90 does so via shared electrolyte manifold 108, which feeds anolyte to all of the cells. The anolyte exits compartment 88 via channel 110, and through shared electrolyte manifold 112, through which all anolyte exits. The catholyte flowing through the conductive bypass path, i.e. passing from the channels connected with manifold 108 and otherwise passing therethrough. Similarly, protective currents are applied across manifolds 112, 114 and 118 through the shared electrolyte.

Both the anolyte and the catholyte are circulated through their respective manifolds, channels and compartments during operation of the device and are recirculated from reservoirs (not shown). As illustrated, the monopolar cells in device 80 are connected electrically in series and hydraulically in parallel. Without application of the protective currents of the present invention, significant shunt currents arise in the channels and manifolds. In this zinc-bromine device, the shunting not only results in loss of capacity and consumption of components, but also causes the growth of zinc at various points where the anolyte leaves and enters zinc electrode compartments.

Device 80 was operated without protective current and with protective current in accordance with the present invention for a discharge cycle, a charge cycle and an open circuit cycle (Examples 6 through 8 respectively). The protective currents were applied with a total voltage drop approximately equal to the terminal battery voltage. The voltage drop in a given manifold was resistive and showed a linear change down the manifold between the protective current electrodes. This linear voltage drop matched the stepwise voltage change at each series cell connection. The net result was that the voltage level at each channel-manifold juncture was equal to the voltage level, for example, at the cell compartment-channel juncture. These equal voltages resulted in a nulling of the shunting current by the protective current. Also, upon application of the protective currents, the non-uniform deposition of zinc at the anolyte channel entrances ceased.

Table II lists the parameters for the test of Example 6 and FIG. 4 illustrates the results obtained. Table III lists the parameters for the test of Example 7 and FIG. 5 illustrates the test results. Table IV lists the parameters for the test of Example 8 and FIG. 6 shows the results obtained.

Figure 6:
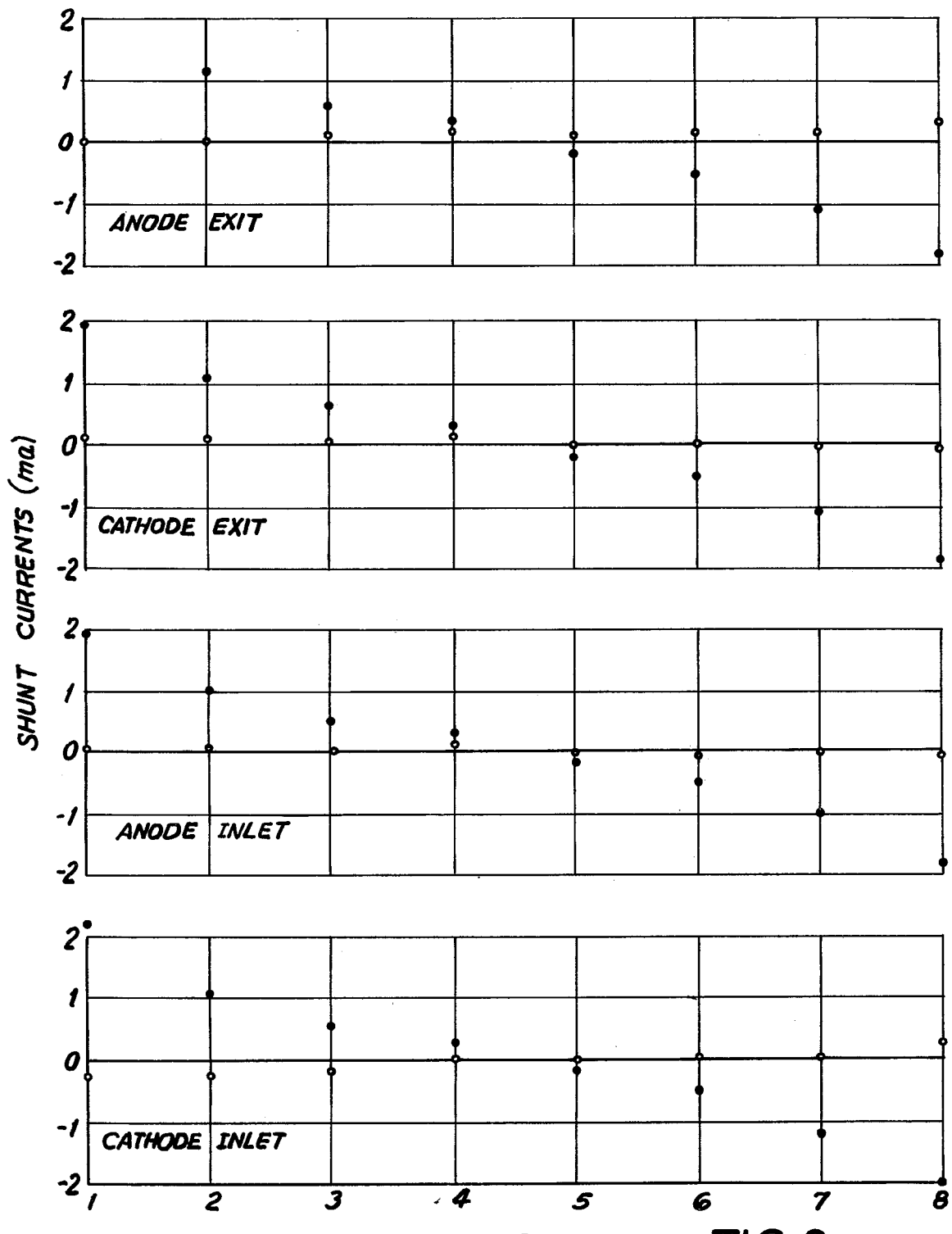

As FIGS. 4, 5 and 6 illustrate, the protective currents minimize shunt currents throughout the device, during discharge, charge and open circuit, when applied through the shared electrolyte of the conductive bypass path.

Table II

| Example 6 Test Parameters |
| --- |
| Mode: Discharge |
| Discharge Current: 39 amps |
| Discharge Voltage: 12.53–12.32 v |
| Time period of readings: 54–65 minutes into discharge. |
| Protective Current (Anolyte Inlet Manifold): 5.7 ma |
| Voltage of Protective Current (Anolyte Inlet Manifold): 13.36 v |
| Protective Current (Anolyte Outlet Manifold): 4.7 ma |
| Voltage of Protective Current (Anolyte Outlet Manifold): 13.36 v |
| Protective Current (Catholyte Inlet Manifold): 2.8 ma |
| Voltage of Protective Current (Catholyte Inlet Manifold): 10.42 v |
| Protective Current (Catholyte Outlet Manifold): 2.6 ma |
| Voltage of Protective Current (Catholyte Outlet Manifold): 10.42 v |

Table III

| Example 7 Test Parameters |
| --- |
| Mode: Charge |
| Charge Current: 26 amps |
| Charge Voltage: 14.98 v |
| Time period of readings: 107–140 minutes into charge. |
| Protective Current (Anolyte Inlet Manifold): 6.25 ma |
| Voltage of Protective Current (Anolyte Inlet Manifold): 15.85 v |
| Protective Current (Anolyte Outlet Manifold): 5.7 ma |
| Voltage of Protective Current (Anolyte Outlet Manifold): 15.85 v |
| Protective Current (Catholyte Inlet Manifold): 5.6 ma |
| Voltage of Protective Current (Catholyte Inlet Manifold): 13.85 v |
| Protective Current (Catholyte Outlet Manifold): 5.3 ma |
| Voltage of Protective Current (Catholyte Outlet Manifold): 13.85 v |

Table IV

| Example 8 Test Parameters |
| --- |
| Mode: Open Circuit |
| Current: O |
| Open Current Voltage: 14.14 v |
| Time period of readings: After 100 minutes of charge |
| Protective Current (Anolyte Inlet Manifold): 6.0 ma |
| Voltage of Protective Current (Anolyte Inlet Manifold): 15.05 v |
| Protective Current (Anolyte Outlet Manifold): 5.2 ma |
| Voltage of Protective Current (Anolyte Outlet Manifold): 15.05 v |
| Protective Current (Catholyte Inlet Manifold): 4.6 ma |
| Voltage of Protective Current (Catholyte Inlet Manifold): 12.31 v |
| Protective Current (Catholyte Outlet Manifold): 4.5 ma |
| Voltage of Protective Current (Catholyte Outlet Manifold): 12.31 v |

What is claimed is:

1. A method of minimizing shunt currents in an electrochemical device having a plurality of cells, said cells being connected, at least in part, in series, said device having an electrolyte which is a common electrolyte to at least two of said cells connected in series and which includes shared electrolyte, whereby an electrical electrolytic conductive bypass path is created around these cells and through said shared electrolyte, which otherwise results in undesirable shunt currents, said method comprising applying a protective current through at least a portion of said conductive bypass path through said shared electrolyte in a direction which is the same as the shunt current through said shared electrolyte and of a magnitude which effectively at least reduces said shunt currents.

2. The method of claim 1 wherein said protective current is applied through said conductive bypass path to reduce shunt currents in a static electrolyte electrochemical device.

3. The method of claim 1 wherein said protective current is applied through shared electrolyte through said conductive bypass path in a circulating electrolyte electrochemical device.

4. The method of claim 3 wherein said electrochemical device has circulating electrolyte by a shared electrolyte common manifold, wherein said conductive bypass path crosses through said manifold and wherein said protective current is applied through at least a part of said shared electrolyte common manifold to reduce shunt currents.

5. The method of claim 1 wherein said electrochemical device has a plurality of cells all of which are connected in series.

6. The method of claim 5 wherein said protective current is applied through said conductive bypass path to reduce shunt currents in a static electrolyte electrochemical device.

7. The method of claim 5 wherein said protective current is applied through shared electrolyte through said conductive bypass path in a circulating electrolyte electrochemical device.

8. The method of claim 7 wherein said electrochemical device has circulating electrolyte by a shared electrolyte common manifold, wherein said conductive bypass path crosses through said manifold and wherein said protective current is applied through at least a part of said shared electrolyte common manifold to reduce shunt currents.

9. The method of claim 1 wherein said electrochemical device is a photoelectrochemical device.

10. The method of claim 1 wherein said electrochemical device is a battery.

11. The method of claim 1 wherein said electrochemical device is a fuel cell device.

12. The method of claim 1 wherein said electrochemical device is a chlor-alkali cell device.

13. The method of claim 1 wherein said electrochemical device is an electrowinning device.

14. The method of claim 1 wherein said electrochemical device is an electrolyzer.

15. The method of claim 1 wherein said electrochemical device is an electrochemical device having a plurality of electrolytes.

16. The method of claim 1 wherein said electrochemical device is an electrochemical device having bipolar cells.

17. The method of claim 1 wherein said electrochemical device is an electrochemical device having monopolar cells.

18. An electrochemical device, comprising:
(a) a plurality of cells, said cells being connected, at least in part, in series;
(b) an electrolyte which is a common electrolyte to at least two of said cells connected in series and which includes shared electrolyte, whereby an electrical electrolytic conductive bypass path is created around these cells and through said shared electrolyte and is capable of resulting in undesirable shunt currents; and,
(c) means for applying a protective current through at least a part of said conductive bypass path through said shared electrolyte in a direction which is the same as the shunt current through said shared electrolyte and of a magnitude which effectively at least reduces said shunt currents.

19. The device of claim 18 wherein said electrolyte is static.

20. The device of claim 18 wherein said electrolyte is a circulating electrolyte.

21. The device of claim 20 further comprising a common manifold for circulation of said electrolyte and wherein said means for applying said protective current is means for applying said protective current across at least a part of said common manifold.

22. The device of claim 18 wherein said plurality of cells are all connected in series.

23. The device of claim 22 wherein said electrolyte is static.

24. The device of claim 22 wherein said electrolyte is a circulating electrolyte.

25. The device of claim 24 further comprising a common manifold for circulation of said electrolyte and wherein said means for applying said protective current is means for applying said protective current across at least a part of said common manifold.

26. The device of claim 18 wherein said device is a photoelectrochemical device.

27. The device of claim 18 wherein said electochemical device is a battery.

28. The device of claim 18 wherein said electrochemical device is a fuel cell device.

29. The device of claim 18 wherein said electrochemical device is a chlor-alkali cell device.

30. The device of claim 18 wherein said electrochemical device is an electrowinning device.

31. The device of claim 18 wherein said electrochemical device is an electrochemical device having a plurality of electrolytes.

32. The device of claim 18 wherein said electrochemical device is an electrolyzer.

33. The device of claim 18 wherein said electrochemical device is an electrochemical device having bipolar cells.

34. The device of claim 18 wherein said electrochemical device is an electrochemical device having monopolar cells.

* * * * *